(12) United States Patent
Araujo Da Silva et al.

(10) Patent No.: US 8,833,417 B2
(45) Date of Patent: Sep. 16, 2014

(54) RUBBER COMPOSITION FOR TIRE INCLUDING A NOVEL ANTI-OXIDANT SYSTEM

(75) Inventors: José Carlos Araujo Da Silva, Pont du Chateau (FR); Arnaud Remy, Orleat (FR)

(73) Assignees: Michelin Recherche et Techniques S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 579 days.

(21) Appl. No.: 12/992,830

(22) PCT Filed: May 14, 2009

(86) PCT No.: PCT/EP2009/055842
§ 371 (c)(1),
(2), (4) Date: Feb. 9, 2011

(87) PCT Pub. No.: WO2009/138460
PCT Pub. Date: Nov. 19, 2009

(65) Prior Publication Data
US 2011/0303338 A1    Dec. 15, 2011

(30) Foreign Application Priority Data
May 15, 2008  (FR) ...................... 08 53145

(51) Int. Cl.
*B60C 1/00* (2006.01)
*C08K 5/18* (2006.01)
*C08K 3/00* (2006.01)
*C08K 3/04* (2006.01)
*C08K 5/00* (2006.01)

(52) U.S. Cl.
CPC ................ *C08K 3/04* (2013.01); *C08K 3/0033* (2013.01); *C08K 5/18* (2013.01); *C08K 5/0008* (2013.01)
USPC ........... 152/537; 524/251; 524/252; 524/255; 524/258; 523/351

(58) Field of Classification Search
USPC .................... 252/401; 524/251, 252, 255, 258
See application file for complete search history.

(56) References Cited

U.S. PATENT DOCUMENTS 3,253,035 A  *  5/1966  Sundholm ...................... 564/434
5,684,073 A  *  11/1997  Midorikawa et al. .......... 524/254
2004/0129360 A1 *  7/2004  Vidal ............................. 152/537

FOREIGN PATENT DOCUMENTS

WO    WO 2004/033548    4/2004

* cited by examiner

*Primary Examiner* — Ling Choi
*Assistant Examiner* — Wenwen Cai
(74) *Attorney, Agent, or Firm* — Cozen O'Connor

(57) ABSTRACT

Rubber composition, especially for a tire, based on at least one diene elastomer, a reinforcing filler, a crosslinking system and an antioxidant system, wherein said antioxidant system comprises at least two antioxidants "A" and "B":

A. an N-alkyl-N'-phenyl-para-phenylenediamine corresponding to the formula (I):

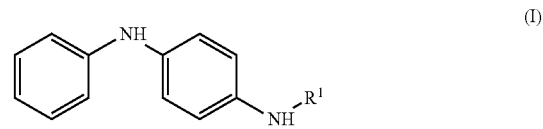

B. a 4,4',4"-tris(alkylamino)triphenylamine corresponding to the formula (II):

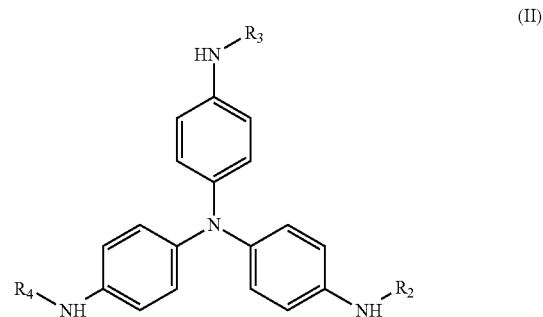

in which formulae, $R^1$, $R^2$, $R^3$ and $R^4$, which are identical or different, each represent a linear or branched alkyl group having from 1 to 12 carbon atoms or a cycloalkyl group having from 5 to 8 carbon atoms, the A/B weight ratio being between 0.1 and 5.0.

13 Claims, 1 Drawing Sheet

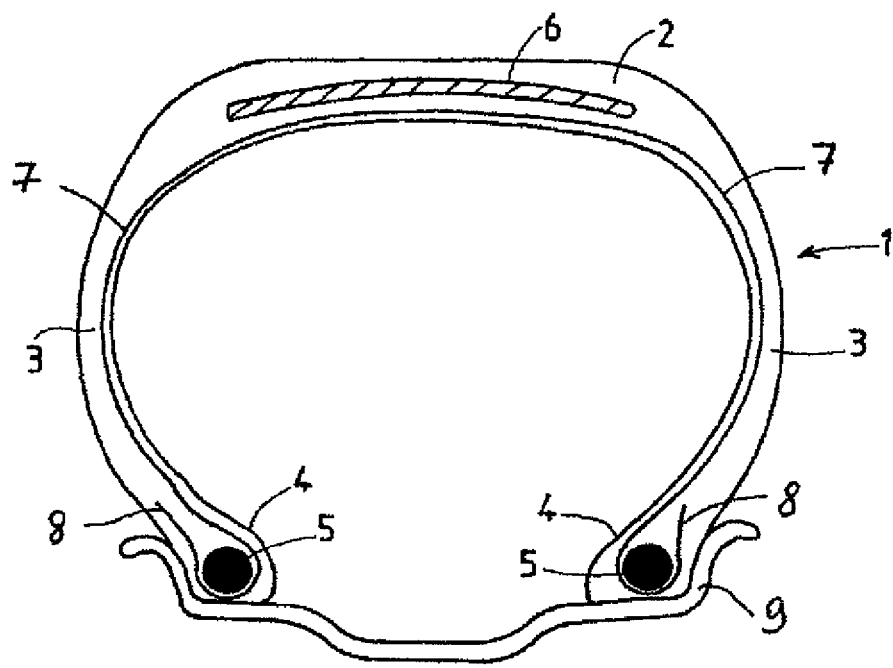

RUBBER COMPOSITION FOR TIRE INCLUDING A NOVEL ANTI-OXIDANT SYSTEM

RELATED APPLICATIONS

This is a U.S. national stage under 35 USC §371 of application No. PCT/EP2009/055842, filed on May 14, 2009.

This application claims the priority of French application Ser. No. 08/53145 filed May 15, 2008, the entire content of which is hereby incorporated by reference.

FIELD OF THE INVENTION

The present invention relates to diene elastomer compositions and also to the antioxidant agents used for the anti-ageing protection of such compositions.

More particularly, it relates to the diene elastomer compositions used to form all or part of the rubbery matrix of tires, especially to the crown reinforcements of these tires, also known as "belts".

BACKGROUND OF THE INVENTION

It will briefly be recalled that a tire having a radial carcass reinforcement comprises, in a known manner, a tread, two inextensible beads, two sidewalls joining the beads to the tread and a belt placed circumferentially between the carcass reinforcement and the tread, this belt consisting of various plies (or "layers") of rubber which may or may not be reinforced by reinforcing elements (or "reinforcements") such as cords or monofilaments, of the metal or textile type.

The tire belt generally consists of at least two superposed belt layers or plies, sometimes known as "working" plies or "crossed" plies, the reinforcements of which are in practice arranged parallel to one another within a layer, but crossed from one layer to the other, that is to say inclined, whether symmetrically or not, to the median circumferential plane, by an angle which is generally between 10° and 45° depending on the type of tire in question. Each of these two crossed layers consists of a rubber matrix generally based on isoprene, sometimes known as "calendaring gum" that coats the reinforcements. The crossed layers may be finished off by various other auxiliary rubber plies or layers, having widths that vary depending on the case, and which may or may not contain reinforcements; mention will be made by way of example of simple rubber pads, of layers known as "protective" layers, the role of which is to protect the rest of the belt from external attack, perforations, or else layers known as "hoop reinforcement" layers comprising reinforcements oriented substantially along the circumferential direction (layers known as "zero degree" layers), whether they are radially external or internal compared to the crossed layers.

This tire belt must meet, in a known manner, numerous, sometimes contradictory, requirements, in particular:
(i) to be as rigid as possible at low deformation, as it substantially contributes to stiffening the tire crown;
(ii) to have as low a hysteresis as possible, to on the one hand, minimise overheating of the internal zone of the crown when rolling and, on the other hand, to reduce the rolling resistance of the tire, which is synonymous with fuel economy; and
(iii) finally to have a high endurance, in particular with respect to the phenomenon of separation or cracking of the ends of the crossed layers in the "shoulder" zone of the tire, a problem which is known by the term "cleavage".

The third condition especially requires that rubber compositions incorporated into the formation of tire belts have a very high resistance to crack propagation and to thermal oxidation, in particular achieved due to the use of antioxidant agents that offer an effective anti-ageing protection.

This requirement is particularly high for the tire covers of heavy vehicles, which are designed to be able to be retreaded one or more times when the treads that they comprise reach a critical degree of wear after prolonged rolling.

The antioxidants used for a very long time as anti-ageing protective agents in rubber compositions for tires, especially in the belts of such tires, belong to the family of the derivatives of para-phenylenediamine (PPD) such as for example N-iso-propyl-N'-phenyl-para-phenylenediamine (I-PPD) or N-1,3-dimethylbutyl-N'-phenyl-para-phenylenediamine (6-PPD) which are simultaneously excellent antioxidants and antiozonants (see, for example, Applications WO 2004/033548, WO 2005/063510, WO 2005/133666).

SUMMARY OF THE INVENTION

The inventors discovered during their research that the replacement of a part of such a para-phenylenediamine-derived antioxidant by another specific antioxidant, which to date has not been used in tires, makes it possible to increase the long-term resistance to fatigue and to crack propagation of these rubber compositions for tires.

Consequently, a first aspect of the invention relates to a rubber composition based on at least one diene elastomer, a reinforcing filler, a crosslinking system and an antioxidant system, characterized in that said antioxidant system comprises at least two antioxidants "A" and "B";

A. an N-alkyl-N'-phenyl-para-phenylenediamine corresponding to the formula (I):

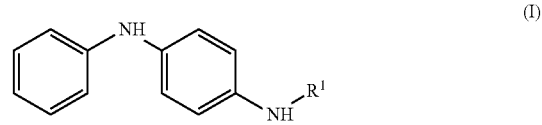

B. a 4,4',4"-tris(alkylamino)triphenylamine corresponding to the formula (II):

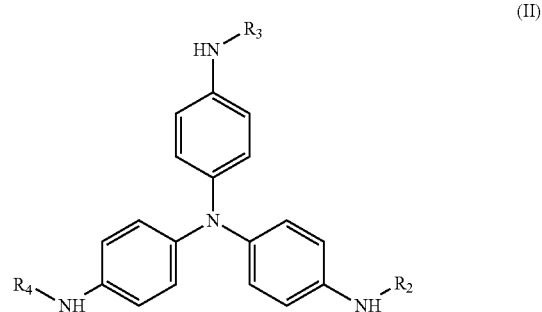

in which formulae, $R^1$, $R^2$, $R^3$ and $R^4$, which are identical or different, each represent a linear or branched alkyl group having from 1 to 12 carbon atoms or a cycloalkyl group having from 5 to 8 carbon atoms, the A/B weight ratio being between 0.1 and 5.0.

The invention thus offers the tire belts, and also these tires themselves, a novel and particularly advantageous overall compromise of properties.

Another aspect of the invention is the use of a composition according to the invention for manufacturing new tires or for retreading worn tires, most particularly in the case of heavy vehicle tires.

The rubber compositions are prepared by a process which constitutes another aspect of the present invention, said process comprising the following steps:

incorporating into a diene elastomer, in a mixer:
  a reinforcing filler; and
  an antioxidant system,
by thermomechanically kneading the entire mixture, in one or more stages, until a maximum temperature between 110° C. and 190° C. is reached;
cooling the entire mixture to a temperature below 100° C.;
then incorporating a crosslinking system;
kneading the entire mixture up to a maximum temperature below 110° C., said process being characterized in that said antioxidant system comprises at least the two aforementioned antioxidants "A" and "B", the A/B weight ratio being between 0.1 and 5.0.

Another aspect of the invention relates to any tire comprising a composition according to an embodiment of the invention, in particular whether this tire is of radial or non-radial type.

The tires made according to an embodiment of the invention are particularly intended to equip motor vehicles of the following types: passenger vehicles, SUVs (sport utility vehicles), two-wheel vehicles (especially motorcycles), aircraft, for instance industrial vehicles chosen from vans, "heavy" vehicles—i.e. underground trains, buses, heavy road transport vehicles (lorries, tractors, trailers), off-road vehicles such as agricultural or civil engineering machines and other transport or handling vehicles.

Another aspect of the invention relates to an antioxidant system that can be used in particular for the anti-ageing protection of a rubber composition for a tire, characterized in that said system comprises at least the two aforementioned antioxidants "A" and "B", the A/B weight ratio being between 0.1 and 5.0.

BRIEF DESCRIPTION OF THE SINGLE DRAWING

The drawing is a schematic FIGURE relating to exemplary embodiments of the invention which represents a radial cross section of a heavy vehicle tire with radial carcass reinforcement.

I. MEASUREMENTS AND TESTS USED

The rubber compositions are characterized before and after curing, as indicated below.

A) Rheometry:

The measurements are carried out at 150° C. with an oscillating-chamber rheometer according to the standard DIN 53529—part 3 (June 1983). The change in the rheometric torque as a function of time describes the change in the stiffening of the composition following the vulcanization reaction. The measurements are processed according to the standard DIN 53529—part 2 (March 1983): $t_i$ is the induction time, that is to say the time necessary for the start of the vulcanization reaction; $t_\alpha$ (for example, $t_{99}$) is the time necessary to attain a conversion of $\alpha\%$, that is to say $\alpha\%$ (for example, 99%) of the difference between the minimum and maximum torques. Also measured is the 1$^{st}$ order conversion rate constant denoted by K (expressed in min$^{-1}$), calculated between 30% and 80% conversion, which makes it possible to assess the vulcanization kinetics.

B) Tensile Tests:

These tests make it possible to determine the elasticity stresses and the properties at break. Unless indicated otherwise, they are carried out in accordance with French standard NF T 46-002 of September 1988. The "nominal" secant moduli (or apparent stresses, in MPa) or "true" secant moduli (relative in this case to the actual cross section of the test piece) at 10% elongation (denoted respectively by MA10 and E10), 100% elongation (respectively MA100 and E100) and 300% elongation (respectively MA300 and E300) are measured in a second elongation (i.e. after an accommodation cycle). All these tensile measurements are carried out under normal temperature (23±2° C.) and hygrometry (50±5% relative humidity) conditions, according to the French standard NF T 40-101 (December 1979). Also measured are the tensile strength (in MPa) and the elongations at break (in %), at a temperature of 23° C.

C) "MFTRA" Test:

The resistance to fatigue and to the propagation of notches (with prior initiation), expressed as the number of cycles or in relative units (u.r.) is measured in a known manner on a test piece comprising a 1 mm notch and subjected to repeated tensile tests of low frequency up to an elongation of 20%, using a Monsanto ("MFTR" type) machine, until the test piece breaks, according to the French standard NF T 46-021.

The above test is carried out on the one hand in the initial state and on the other hand after an accelerated thermal oxidative ageing of 24 days, the composition sample tested then being placed in a ventilated oven kept at a temperature of 77° C. and under an ambient humidity of 40%. A value greater than that of the control, arbitrarily set at 100, indicates an improved result, that is to say a greater resistance.

II. DETAILED DESCRIPTION OF EMBODIMENTS OF THE INVENTION

The elastomeric compositions of the invention are based on at least the following constituents: (i) a (at least one) diene elastomer; (ii) a (at least one) reinforcing filler; (iii) a crosslinking system; and (iv) an antioxidant system as described in detail below.

Of course, the expression "composition based on" should be understood to mean a composition comprising the reaction product and/or mixture of the various constituents used, some of these base constituents being capable of, or intended to, react together, at least partly, during the various manufacturing phases of the rubber compositions, belts and tires, in particular during their vulcanization.

In the present description, unless expressly indicated otherwise, all the percentages (%) indicated are % by weight.

II-1. Diene Elastomer

The term "diene" elastomer (or rubber, the two being considered to be synonymous) is understood to mean, generally, an elastomer derived at least in part (i.e., a homopolymer or a copolymer) from diene monomers, that is to say from monomers bearing two (conjugated or unconjugated) carbon-carbon double bonds.

Diene elastomers may be classified, in a known manner, in two categories: those said to be "essentially unsaturated" and those said to be "essentially saturated". Generally, the expression "essentially unsaturated diene elastomer" is understood here to mean a diene elastomer resulting at least partly from conjugated diene monomers, having a number of diene units or units of diene origin (conjugated dienes) that is greater than 15% (mol %). Thus, for example, diene elastomers such as butyl rubbers or diene/α-olefin copolymers of the EPDM type do not fall within the above definition and may in particular be termed "essentially saturated diene elastomers" (small or very small number of units of diene origin, always less than 15%). Within the "essentially unsaturated" diene elastomer category, the expression "highly unsaturated diene elastomer" is understood in particular to mean a diene elastomer having a number of units of diene origin (conjugated dienes) that is greater than 50%.

Having given these definitions, it will be understood more particularly that a diene elastomer that can be used in the compositions according to the invention means:
(a)—any homopolymer obtained by polymerizing a conjugated diene monomer preferably having 4 to 12 carbon atoms;
(b)—any copolymer obtained by copolymerizing one or more conjugated dienes with one another or with one or more vinylaromatic compounds preferably having 8 to 20 carbon atoms;
(c)—a ternary copolymer obtained by copolymerizing ethylene, an α-olefin preferably having 3 to 6 carbon atoms with an unconjugated diene monomer preferably having 6 to 12 carbon atoms, such as for example the elastomers obtained from ethylene, propylene and an unconjugated diene monomer of the aforementioned type such as in particular 1,4-hexadiene, ethylidene norbornene and dicyclo-pentadiene; and
(d)—a copolymer of isobutene and isoprene (butyl rubber), and also the halogenated, in particular chlorinated or brominated, versions of this type of copolymer.

Although the present invention applies to any type of diene elastomer, a person skilled in the art of tires will understand that it is firstly used with essentially unsaturated diene elastomers, in particular of the (a) or (b) type above.

More preferably, the diene elastomer is chosen from the group formed by polybutadienes (BR), natural rubber (NR), synthetic polyisoprenes (IR), various butadiene copolymers, various isoprene copolymers, and blends of these elastomers. Such copolymers are more preferably chosen from the group formed by butadiene-stirene (SBR) copolymers, whether the latter are prepared by polymerization in emulsion (ESBR) or in solution (SSBR), isoprene-butadiene (BIR) copolymers, isoprene-stirene (SIR) copolymers and isoprene-butadiene-stirene (SBIR) copolymers.

Among the polybutadienes, those that are suitable are in particular those having a (mol %) content of -1,2 units between 4% and 80% or those having a (mol %) content of cis-1,4 units greater than 80%. Among the synthetic polyisoprenes, those that are particularly suitable are cis-1,4-polyisoprenes, preferably those having a (mol %) content of cis-1,4 bonds greater than 90%. Among the butadiene or isoprene copolymers, these are understood to mean in particular the copolymers obtained by copolymerizing at least one of these two monomers with one or more vinylaromatic compounds having 8 to 20 carbon atoms. Suitable vinylaromatic compounds are, for example, stirene, ortho-, meta- and para-methylstirene, the commercial "vinyl-toluene" mixture, para-tert-butylstirene, methoxystirenes, chlorostirenes, vinylmesitylene, divinylbenzene and vinylnaphthalene. The copolymers may contain between 99% and 20% of diene units and between 1% and 80% of vinylaromatic units.

The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. Mention may be made, for coupling to carbon black, for example, of functional groups comprising a C—Sn bond or aminated functional groups, such as benzophenone, for example; mention may be made, for coupling to a reinforcing inorganic filler, such as silica, of, for example, silanol or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or polyether groups (such as described, for example, in EP 1 127 909 or U.S. Pat. No. 6,503,973). Mention may also be made, as other examples of functionalized elastomers, of elastomers (such as SBR, BR, NR or IR) of the epoxidized type.

The compositions according to the invention are preferably intended for tires, in particular for the carcass reinforcements for tires for industrial vehicles such as vans or heavy vehicles, and also for crown reinforcements of tires intended both for passenger vehicles and for industrial vehicles.

Use is then preferably made of at least one isoprene elastomer, that is to say an isoprene homopolymer or copolymer, in other words a diene elastomer chosen from the group composed of natural rubber (NR), synthetic polyisoprenes (IRs), various isoprene copolymers and blends of these elastomers. Among the isoprene copolymers, mention will in particular be made of the isobutene/isoprene (butyl rubber—IIR), isoprene/stirene (SIR), isoprene/butadiene (BIR) or isoprene/butadiene/stirene (SBIR) copolymers.

The isoprene elastomer is preferably natural rubber or a synthetic cis-1,4-polyisoprene. Among these synthetic polyisoprenes, preferably use is made of polyisoprenes having a (mol %) content of cis-1,4 bonds greater than 90%, more preferably still greater than 98%.

By blending (i.e. mixing) with the isoprene elastomer above, the compositions of the invention may contain diene elastomers other than isoprene elastomers, preferably in a minority (i.e. less than 50 phr). The isoprene elastomer more preferably represents 75 to 100% by weight of all the diene elastomers, i.e. 75 to 100 phr (phr=parts by weight per hundred parts of rubber).

As such diene elastomers other than isoprene elastomers, mention will especially be made of any diene elastomer of the unsaturated type chosen, in particular, from the group composed of polybutadienes (BRs), in particular cis-1,4 or 1,2-syndiotactic polybutadienes and those having a (mol %) content of 1,2-units between 4% and 80%, and butadiene copolymers, especially stirene/butadiene (SBR) copolymers, and in particular those having a stirene content between 5 and 50% by weight and more particularly between 20% and 40% by weight, a (mol %) content of 1,2-bonds of the butadiene part between 4% and 65%, a (mol %) content of trans-1,4 bonds between 30% and 80%, stirene/butadiene/isoprene (SBIR) copolymers, and blends of these various elastomers (BR, SBR and SBIR).

By way of example, when the composition is intended for a tire of the passenger vehicle type, if such a blend is used, it is preferably a mixture of SBR and of BR which is used as a blend with natural rubber, preferably to a limit of less than 25% by weight (or less than 25 phr) of SBR and BR mixture.

The composition of the invention can be particularly used in a heavy vehicle tire belt, whether this is a new tire or a worn tire (in the case of retreading). In such a case, the isoprene elastomer is preferably used alone, that is to say without blending with another diene elastomer or polymer. More preferably still, this isoprene elastomer is exclusively natural rubber.

II-2. Reinforcing Filler

It is possible to use any type of reinforcing filler known for its abilities to reinforce a rubber composition that can be used for manufacturing tires, for example an organic filler such as carbon black, or else an inorganic reinforcing filler such as silica, with which a coupling agent must be associated.

As carbon blacks, all the carbon blacks are suitable, especially the blacks of the HAF, ISAF, SAF type conventionally used in tires (known as tire-grade blacks). Among the latter, mention will more particularly be made of the reinforcing carbon blacks of the 100, 200 or 300 series (ASTM grades), such as for example the blacks N115, N134, N234, N326, N330, N339, N347, N375, or else, depending on the targeted applications, the blacks of higher series (for example, N660, N683, N772, N900). The carbon blacks could be, for example, already incorporated into the isoprene elastomer in the form of a masterbatch (see, for example, Applications WO 97/36724 or WO 99/16600).

Mention may be made, as examples of organic fillers other than carbon blacks, of the functionalized polyvinylaromatic organic fillers as described in Applications WO-A-2006/069792 and WO-A-2006/069793.

The expression "inorganic reinforcing filler" should be understood, in the present application, to mean, by definition, any inorganic or mineral filler (regardless of its colour and its origin (natural or synthetic)), also known as a "white" filler, "clear" filler or even a "non-black filler" as opposed to carbon black, capable of reinforcing, by itself without any means other than an intermediate coupling agent, a rubber composition intended for manufacturing tires, in other words capable of replacing, in its reinforcing role, a conventional tire-grade carbon black; such a filler is generally characterized, in a known manner, by the presence of hydroxyl (—OH) groups at its surface.

The physical state under which the reinforcing inorganic filler is provided is not important, whether it is in the form of a powder, of micropearls, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Suitable inorganic reinforcing fillers are especially mineral fillers of the siliceous type, in particular silica ($SiO_2$) or of the aluminous type, in particular alumina ($Al_2O_3$). The silica used may be any reinforcing silica known to a person skilled in the art, especially any precipitated or fumed silica having a BET surface area and also a CTAB specific surface area that are both below 450 $m^2/g$, preferably from 30 to 400 $m^2/g$. As highly dispersible (known as "HD") precipitated silicas, mention will be made, for example, of the silicas Ultrasil 7000 and Ultrasil 7005 from Degussa, the silicas Zeosil 1165 MP, 1135 MP and 1115 MP from Rhodia, the silica Hi-Sil EZ150G from PPG, the silicas Zeopol 8715, 8745 and 8755 from Huber, and the silicas having a high specific surface area such as described in Application WO 03/16837.

When the compositions of the invention are intended for tire treads having low rolling resistance, the inorganic reinforcing filler used, in particular when this is silica, preferably has a BET surface area between 45 and 400 $m^2/g$, more preferably between 60 and 300 $m^2/g$.

Preferably, the total reinforcing filler content (carbon black, inorganic reinforcing filler or mixture of these two types of filler) is between 20 and 200 phr, more preferably between 30 and 150 phr, the optimum being, in a known manner, different depending on the particular applications targeted: the level of reinforcement expected with regard to a bicycle tire, for example, is, of course, less than that required with regard to a tire capable of running at high speed in a sustained manner, for example a motorcycle tire, a tire for a passenger vehicle or a tire for a utility vehicle, such as a heavy vehicle.

According to one preferred embodiment of the invention, a reinforcing filler having between 30 and 150 phr, more preferably between 50 and 120 phr, of inorganic filler, particularly of silica, and optionally of carbon black, is used; the carbon black, when present, is preferably used at a content below 20 phr, more preferably below 10 phr (for example between 0.1 and 10 phr).

In order to couple the inorganic reinforcing filler to the diene elastomer, use is made, in a known manner, of an at least bifunctional coupling agent (or bonding agent) intended to provide a sufficient connection, of chemical and/or physical nature, between the inorganic filler (surface of its particles) and the diene elastomer, in particular bifunctional organosilanes or polyorganosiloxanes.

Use is especially made of polysulphide silanes, said to be "symmetrical" or "asymmetrical" depending on their particular structure, such as described, for example, in applications WO 03/002648 and WO 03/002649.

Particularly suitable, without the definition below being limiting, are polysulphide silanes said to be "symmetrical" corresponding to the following general formula:

Z-A-$S_n$-A-Z, in which n is an integer from 2 to 8 (preferably from 2 to 5);

A is a divalent hydrocarbon-based radical (preferably $C_1$-$C_{18}$ alkylene groups or $C_6$-$C_{12}$ arylene groups, more particularly $C_1$-$C_{10}$, especially $C_1$-$C_4$, alkylenes, in particular propylene); and Z corresponds to one of the formulae below:

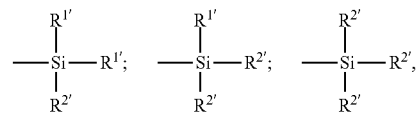

in which:

the $R^{1'}$ radicals, which are substituted or unsubstituted, and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, especially $C_1$-$C_4$ alkyl groups, more particularly methyl and/or ethyl); and the $R^{2'}$ radicals, which are substituted or unsubstituted and identical to or different from one another, represent a $C_1$-$C_{18}$ alkoxy or $C_5$-$C_{18}$ cycloalkoxy group (preferably a group chosen from $C_1$-$C_8$ alkoxy and $C_5$-$C_8$ cycloalkoxy groups, more preferably still a group chosen from $C_1$-$C_4$ alkoxy groups, in particular methoxy and ethoxy groups).

In the case of a mixture of polysulphide alkoxysilanes corresponding to the formula above, especially the usual commercially available mixtures, the average value of "n" is a fraction preferably between 2 and 5, more preferably close to 4. But the invention may also advantageously be carried out, for example, with disulphide alkoxysilanes (n=2).

As examples of polysulphide silanes, mention will more particularly be made of polysulphides (especially disulphides, trisulphides or tetrasulphides) of his ((C$_1$-C$_4$)alkoxy (C$_1$-C$_4$)alkylsilyl(C$_1$-C$_4$)alkyl) such as for example the polysulphides of bis(3-trimethoxy-silylpropyl) or of bis(3-triethoxysilylpropyl). Among these compounds, use is made, in particular, of bis(3-triethoxysilylpropyl)tetrasulphide, abbreviated to TESPT, of formula [(C$_2$H$_5$O)$_3$Si(CH$_2$)$_3$S$_2$]$_2$ or bis(triethoxysilylpropyl)disulphide, abbreviated to TESPD, of formula [(C$_2$H$_5$O)$_3$Si(CH$_2$)$_3$S]$_2$. Mention will also be made, as preferred examples, of the polysulphides (especially disulphides, trisulphides or tetrasulphides) of bis(mono(C$_1$-C$_4$)alkoxydi(C$_1$-C$_4$)alkyl-silylpropyl), more particularly bis (monoethoxydimethyl-silylpropyl)tetrasulphide as described in Patent Application WO 02/083782.

As a coupling agent other than a polysulphide alkoxy silane, mention will especially be made of bifunctional POSs (polyorganosiloxanes) or else of hydroxysilane polysulphides (R$^{2'}$=OH in the formula above) as described in Patent Applications WO 02/30939 and WO 02/31041, or else of silanes or POSs bearing azodicarbonyl functional groups, such as described, for example, in Patent Applications WO 2006/125532, WO 2006/125533 and WO 2006/125534.

In the rubber compositions according to the invention, the content of coupling agent is preferably between 4 and 12 phr, more preferably between 3 and 8 phr.

The coupling agent could be pregrafted to the diene elastomer or to the inorganic reinforcing filler. It is preferred however, especially for reasons of better processing of the compositions in the green state, to use the coupling agent either grafted to the inorganic reinforcing filler, or in the free state (i.e. ungrafted).

Finally, a person skilled in the art will understand that, as a filler equivalent to the inorganic reinforcing filler described in the present section, a reinforcing filler of another nature, especially of organic nature, could be used as long as this reinforcing filler is covered with an inorganic layer such as silica, or else comprises, at its surface, functional sites, especially hydroxyl sites, requiring the use of a coupling agent to establish the bond between the filler and the elastomer.

II-3. Antioxidant System

The antioxidant system of the invention has the main feature of comprising, in combination, two antioxidant agents denoted by "A" and "B":

A. an N-alkyl-N'-phenyl-para-phenylenediamine corresponding to the formula (I):

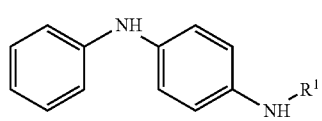

(I)

B. a 4,4',4''-tris(alkylamino)triphenylamine corresponding to the formula (II):

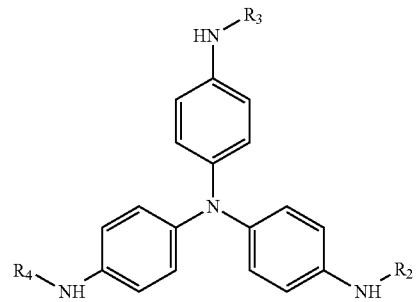

(II)

in which formulae, R$^1$, R$^2$, R$^3$ and R$^4$, which are identical or different, each represent a linear or branched alkyl group having from 1 to 12 carbon atoms or a cycloalkyl group having from 5 to 8 carbon atoms, the A/B weight ratio being between 1/10 and 5/1.

Preferably, the A/B weight ratio is between 1/10 and 5/1, and more preferably between 1/7 and 4/1 (i.e. between 0.14 and 4.0).

Preferably, R$^1$, R$^2$, R$^3$ and R$^4$, which are identical or different, each represent an alkyl group having from 2 to 8 carbon atoms, preferably chosen from the group composed of ethyl, propyl, (i.e. n-propyl, iso-propyl), butyl (i.e. n-butyl, sec-butyl and tert-butyl), pentyl, hexyl, heptyl and octyl groups, or a cycloalkyl group having from 5 to 8 carbon atoms (a cyclopentyl, cyclohexyl, cycloheptyl or cyclooctyl group), more preferably a cyclohexyl group.

Among the compounds of formula (I) and (II) above, use is more preferably made of compounds for which the R$^1$, R$^2$, R$^3$ and R$^4$ groups are branched, of respective formulae (I-bis) and (II-bis) below:

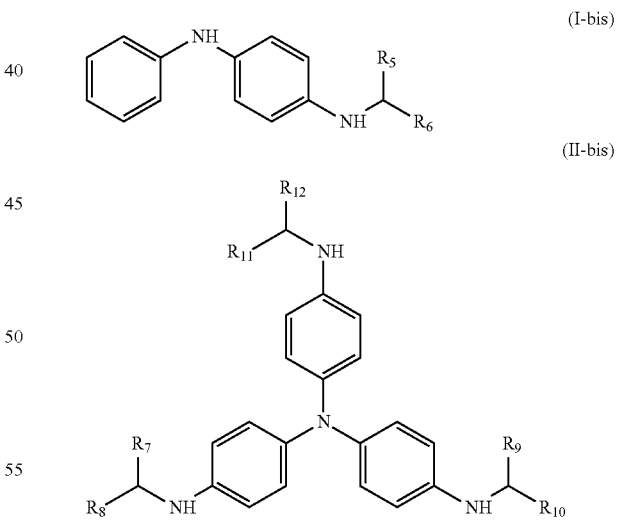

in which R$^5$, R$^6$, R$^7$, R$^8$, R$^9$, R$^{10}$, R$^{11}$ and R$^{12}$, which are identical or different from one another, each represent an alkyl group for which the number of carbon atoms conforms to the preferred definitions given above for R$^1$, R$^2$, R$^3$ and R$^4$.

The compounds of formula (I-bis) above are well known to a person skilled in the art, as recalled in the introduction of the present document.

Compounds corresponding to the generic formulae (II) and (II-bis) above are known as antiozonants for rubber; some have, for example, been described, and also their synthesis, in Patent FR 1,354,536. But no application in diene elastomer compositions for tires, a fortiori in the belts of said tires, has been envisaged therein.

As more preferred examples of branched $R^1$, $R^2$, $R^3$ and $R^4$ radicals, mention will, in particular, be made of isopropyl (a), 1,3-dimethylbutyl (b) and 1,4-dimethyl-pentyl (c) radicals of formulae below:

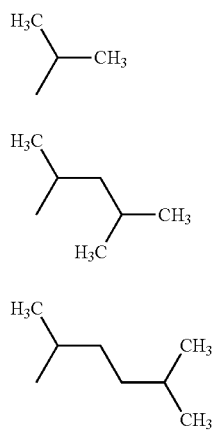

Thus, according to one particularly preferred embodiment of the invention, use is made, as antioxidant A, of one of the following two compounds:

N-isopropyl-N'-phenyl-para-phenylenediamine ("I-PPD") corresponding to the formula:

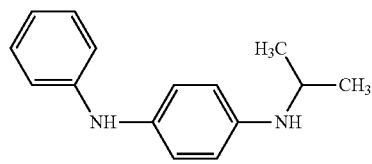

N-1,3-dimethylbutyl-N'-phenyl-para-phenylenediamine ("6-PPD") corresponding to the formula:

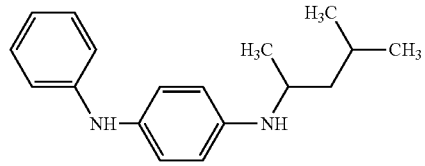

According to another particularly preferred embodiment, that may or may not be combined with the previous one, use is made, as antioxidant B, of one of the following two compounds:

4,4',4"-tris(1,3-dimethylbutylamino)triphenylamine corresponding to the specific formula:

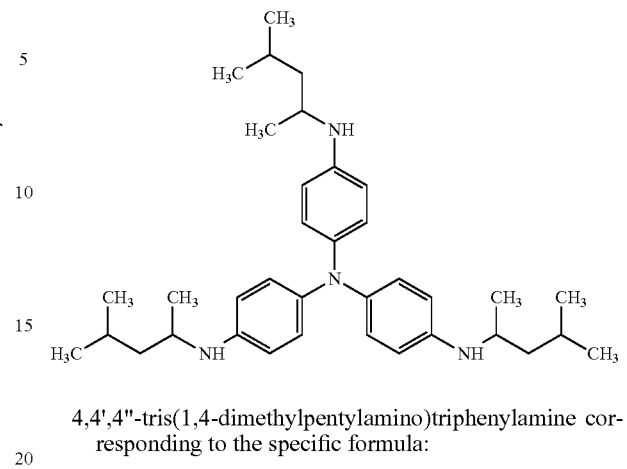

4,4',4"-tris(1,4-dimethylpentylamino)triphenylamine corresponding to the specific formula:

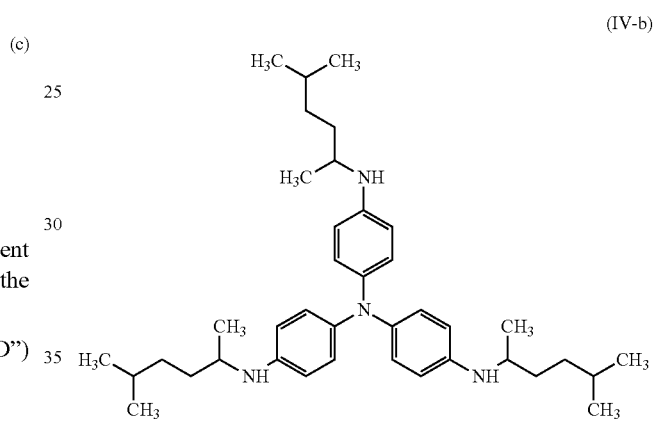

In the rubber composition of the invention, the content of each antioxidant A and B is preferably between 0.5 and 5 phr, that of the total antioxidant system itself preferably being between 1 and 10 phr. Below the minimum indicated, the endurance may prove to be insufficient whereas above the maximum recommended, there is a risk of degradation of the mechanical properties due to an unwanted plasticizing effect. For all these reasons, the content of each antioxidant A and B is more preferably between 0.5 and 3.0 phr, that of the total antioxidant system itself more preferably being between 1.5 and 4 phr.

II-4. Various Additives

The rubber compositions according to the invention may also comprise all or some of the customary additives used in rubber compositions for tires, especially for tire belts, such as for example extending oils, plasticizers, anti-ageing protective agents other than those mentioned above, such as anti-ozone agents, other chemical antiozonants or antioxidants, anti-fatigue agents, acceptors and donors of methylene, bis-maleimides or other reinforcing resins, a cross-linking system based either on sulphur, or on sulphur and/or peroxide donors, vulcanization accelerators, vulcanization activators or retarders, anti-reversion agents such as, for example, sodium hexathiosulphonate or N,N'-m-phenylenebiscitraconimide, systems for promoting the adhesion of the rubber to metal such as, for example, metallic complexes or salts (for example containing cobalt, boron, phosphorus, or else lanthanide salts such as described in the aforementioned Application WO 2005/133666).

The isoprene matrices may also contain, in addition to optional coupling agents for inorganic reinforcing fillers, agents for covering these inorganic fillers, or more generally processing aids capable of, in a known manner, owing to an improvement in the dispersion of the filler in the rubber matrix and to a reduction in the viscosity of the compositions, improving their processability.

II-5. Rubber Compositions and Tires According to the Invention

The diene compositions described previously can especially be used to form all or part of the rubbery matrix of the belt of a tire, in particular of a tire for a heavy vehicle or a passenger vehicle.

They can, for example, be used as a rubber gum for calendering a belt layer or ply of cord fabric, whether this is a "crossed" layer, a protective layer or a layer for hoop reinforcement (at zero degrees), or for example they are intended to form a simple pad, band or strip of rubber gum, free of reinforcements, positioned radially on top of or underneath the various aforementioned belt layers, or even inserted between the latter, for example to form a sublayer of the tread, or else placed at the lateral ends of these belt layers, in the "shoulder" zones of the tire, for example to form decoupling rubber gums.

By way of example, the appended single FIGURE schematically represents a radial cross section of a heavy vehicle tire 1 having radial carcass reinforcement which may or may not conform to the invention, in this general representation. This tire 1 comprises a crown 2, two sidewalls 3, two beads 4, a radial carcass reinforcement 7 extending from one bead to the other. The crown 2, topped with a tread (not represented in this very schematic FIGURE, for simplification) is, in a known manner, reinforced by a belt 6 composed of at least two "crossed" crown layers, covered with at least one crown protection layer, all these layers being reinforced by metallic cords made of carbon steel. The carcass reinforcement 7 is wound around two bead wires 5 in each bead 4, the upturn 8 of this reinforcement 7 being, for example, directed towards the outside of the tire 1 which is shown here mounted on its rim 9. The carcass reinforcement 7 is made up of at least one ply or layer reinforced with metallic cords known as "radial" cords, that is to say that these cords are arranged practically parallel to one another and extend from one bead to the other so as to form an angle of between 80° and 90° with the median circumferential plane (the plane perpendicular to the axis of rotation of the tire which is located half-way between the two beads 4 and passes through the middle of the belt 6).

The tire according to the invention from the above example has the main feature of comprising, in its crown 2, a belt 6 for which the calendering gum of the belt layers 6 (two crossed layers and one protective layer, in this example) comprises the antioxidant system of the invention.

In the case of a tire comprising, for example, one or more "zero degree" layers, it is preferred that the rubber gum for calendering the corded fabric, whether it is in the form of a layer having a certain width, close to the width of the crossed layers, in the form of narrower strips, or even in the form of a single rubber-sheathed wire, is also based on a diene composition, especially an isoprene composition, comprising the antioxidant system of the invention.

According to one preferred embodiment of the invention, the rubber composition based on the diene elastomer (especially the isoprene elastomer), the reinforcing filler and the antioxidant system of the invention has, in the vulcanized state (i.e. after curing), a secant modulus in extension (MA10) which is greater than 3 MPa, more preferably between 5 and 18 MPa. It is in the moduli ranges indicated above that the best endurance compromise is recorded.

II-6. Preparation of the Rubber Compositions

The rubber compositions are manufactured in suitable mixers, using two successive preparation stages well known to a person skilled in the art: a first stage of thermomechanical working or kneading (sometimes referred to as a "non-productive" stage) at high temperature, up to a maximum temperature (denoted by $T_{max}$) between 110° C. and 190° C., preferably between 130° C. and 180° C., followed by a second stage of mechanical working (sometimes referred to as a "productive" stage) at a lower temperature, typically below 110° C., for example between 40° C. and 100° C., during which finishing stage the crosslinking or vulcanization system is incorporated.

The process for manufacturing the compositions of the invention is characterized in that at least the reinforcing filler and the antioxidant system of the invention are incorporated by kneading into the diene elastomer (especially the isoprene elastomer) during the first non-productive stage, that is to say that at least these various base constituents are introduced into the mixer and are thermomechanically kneaded, in one or more steps, until a maximum temperature between 110° C. and 190° C., preferably between 130° C. and 180° C., is reached.

By way of example, the first (non-productive) stage is carried out in a single thermomechanical step during which the following are introduced into a suitable mixer such as a conventional internal mixer: firstly all the necessary base constituents (diene elastomer, reinforcing filler and antioxidant system), then secondly, for example after kneading for one to two minutes, the optional complementary processing aids and other various additives, apart from the crosslinking or vulcanization system. The total kneading time, in this non-productive stage, is preferably between 2 and 10 minutes.

After cooling the mixture thus obtained, the vulcanization system is then incorporated at low temperature, generally in an external mixer such as a roll mill; the whole mixture is then blended (productive stage) for a few minutes, for example between 5 and 15 minutes.

The final composition thus obtained is then calendered, for example in the form of sheets (thickness of 2 to 3 mm) or of thin films of rubber in order to measure its physical or mechanical properties, especially for laboratory characterization, or else extruded to form a rubber profile that can for example be used directly, after cutting or assembling to the targeted dimensions, and after incorporating the desired textile or metallic reinforcements, such as a tire belt layer.

In summary, the process according to the invention, for preparing a rubber composition based on at least one diene elastomer, a reinforcing filler, a crosslinking system and an antioxidant agent, comprises the following steps:
  incorporating into a diene elastomer, especially an isoprene elastomer, in a mixer:
    a reinforcing filler; and
    an antioxidant system,
  by thermomechanically kneading the entire mixture, in one or more stages, until a maximum temperature between 110° C. and 190° C. is reached;
  cooling the entire mixture to a temperature below 100° C.;
  then incorporating a crosslinking system;
  kneading the entire mixture up to a maximum temperature below 110° C.,
and it is characterized in that said antioxidant system comprises at least the antioxidants A and B described in detail previously, in the recommended respective proportions.

The vulcanization or curing is carried out in a known manner at a temperature preferably between 130° C. and 200° C. and under pressure, for a sufficient time which may vary, for example, between 5 and 90 min depending, in particular, on the curing temperature, the vulcanization system used, the vulcanization kinetics and for example the size of the tire in question.

The crosslinking system itself is preferably based on sulphur and on a primary vulcanization accelerator. Generally added to this vulcanization system, incorporated during the first non-productive stage and/or during the productive stage, are various known secondary accelerators or vulcanization activators such as zinc oxide, stearic acid, guanidine derivatives (in particular, diphenylguanidine), vulcanization retarders, etc. Sulphur is used in an amount preferably between 1 and 10 phr, more preferably between 2 and 8 phr, especially when the invention is applied to a heavy vehicle type tire. The primary vulcanization accelerator is used in an amount preferably between 0.5 and 5 phr, more preferably between 0.5 and 2 phr.

It is possible to use, as a (primary or secondary) accelerator any compound capable of acting as a vulcanization accelerator for diene elastomers in the presence of sulphur, especially accelerators of the thiazole type and also derivatives thereof, accelerators of the thiuram or zinc dithiocarbamate type. These accelerators are more preferably chosen from the group composed of 2-mercaptobenzothiazyl disulphide (abbreviated to MBTS), N-cyclohexyl-2-benzothiazyl sulphenamide (abbreviated to CBS), N,N-dicyclohexyl-2-benzothiazyl sulphenamide (abbreviated to DCBS), N-tert-butyl-2-benzothiazyl sulphenamide (abbreviated to TBBS), N-tert-butyl-2-benzothiazyl sulphenamide (abbreviated to TBSI), zinc dibenzyldithiocarbamate (abbreviated to ZBEC) and mixtures of these compounds. Preferably, a primary accelerator of the sulphenamide type is used.

It goes without saying that the invention relates to the rubber compositions and tires described previously both in the "green" state (i.e. before curing) and in the "cured" or vulcanized state (i.e. after crosslinking or vulcanization).

III. EXEMPLARY EMBODIMENTS

III-1. Synthesis of 4,4',4''-tris(1,3-dimethylbutyl-amino)triphenylamine

The compound of formula (IV-a) was prepared according to synthesis as follows.

Added to a 0.6 liter autoclave equipped with a stirrer were 11.0 g of tris(p-aminophenyl)amine from Organica Feinchemie GmbH, 300 ml of methyl isobutyl ketone and 0.8 g of 5% platinum on carbon. While being stirred, the medium was placed under a hydrogen pressure between 2.1 and 3.5 MPa for 60 minutes at 160-165° C. The medium was then filtered in order to remove the catalyst, then evaporated under reduced pressure. The 4,4',4''-tris(1,3-dimethylbutylamino) triphenylamine residue obtained in an amount of 20.2 g was 97.6% pure according to gas chromatography and was in the form of a deep violet solid.

III-2. Preparation of the Rubber Compositions

The tests below were carried out in the following manner: introduced into an internal mixer, filled to 70% and of which the initial chamber temperature was around 60° C., were an isoprene elastomer, a reinforcing filler (carbon black), then, after kneading for one to two minutes, the various other ingredients, including the antioxidant, or antioxidants, depending on the case but excluding the vulcanization system. Next a thermomechanical working stage (non-productive stage) was carried out in one or two steps (total kneading time equal, for example, to around 7 min), until a maximum "dropping" temperature of around 165-170° C. was reached. The mixture thus obtained was recovered, cooled, then the vulcanization system (sulphur and primary sulphenamide accelerator) was added in an external mixer (homo-finisher) at 30° C., by mixing everything (productive phase) for example for 3 to 10 min.

The compositions thus obtained were then either extruded in the form of sheets (thickness of 2 to 3 mm) in order to measure their physical or mechanical properties, or calendered to produce a metallic cord fabric forming a belt layer ("working" layer) of a heavy vehicle tire.

III-3. Characterization Tests

The objective of this test was to demonstrate the improved endurance properties of an isoprene composition for a tire belt, when it comprises an antioxidant system according to the invention, in comparison to a first control rubber composition using no antioxidant and a second control rubber composition using only the conventional antioxidant (6-PPD) of formula (III-b).

For this, three compositions based on natural rubber were prepared:
  composition denoted by C-1 (control with conventional antioxidant A);
  composition denoted by C-2 (according to the invention, with combined antioxidants A and B, having the same content of active principle with respect to composition C-1).
  composition denoted by C-3 (according to the invention, with combined antioxidants A and B, having the same content of active principle with respect to composition C-1 but with different proportions of antioxidants A and B with respect to composition C-2).
  composition denoted by C-4 (according to the invention, with combined antioxidants A and B, having the same content of the conventional antioxidant A with respect to composition C-1).

These four compositions, having formulations that were vigorously identical apart from the nature and the concentration of antioxidant, were intended to constitute the "calendering gum" of working layers of a belt for a heavy vehicle tire.

Tables 1 and 2 give the formulation of the four compositions (Table 1—contents of the various products expressed in phr), their properties before and after curing (60 min at 140° C.) and also the results of the MFTRA endurance test, in relative units (r.u.) (base 100 set for the control composition C-1, both in the initial state and after ageing).

The vulcanization system was composed of sulphur and sulphenamide. In composition C-3 of the invention, half of the conventional antioxidant (6-PPD of formula III-b) was replaced by the antioxidant of formula (IV-a).

Remember that the compound 6-PPD, reference antioxidant in the rubber compositions for tires, especially in the belts of the latter, has the expanded formula (III-b):

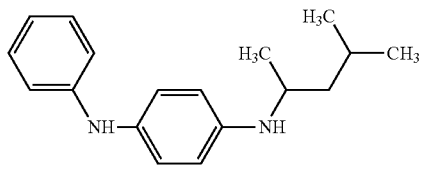 [SMILES: CC(C)CC(C)Nc1ccc(Nc2ccccc2)cc1]

For comparison, the 4,4',4"-tris(1,3-dimethylbutyl-amino) triphenylamine used in compositions C-2, C-3 and C-4 as a complement, has the formula (IV-a):

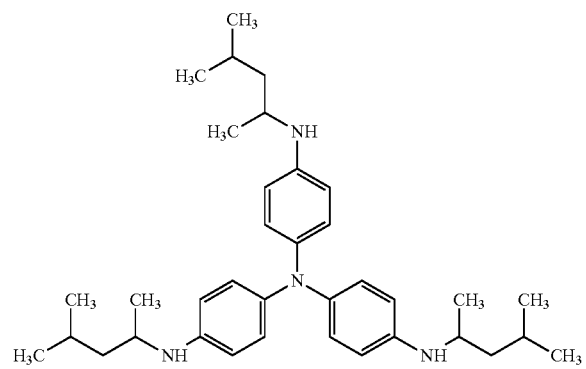 [SMILES: CC(C)CC(C)Nc1ccc(N(c2ccc(NC(C)CC(C)C)cc2)c2ccc(NC(C)CC(C)C)cc2)cc1]

It can immediately be noted that the second molecule has a significantly greater steric hindrance and therefore a reduced ability to diffuse, which, for a person skilled in the art, is, a priori, unfavourable to an effective antifatigue protection.

On examining the results from Table 2, it is first noted that the three compositions C-2, C-3 and C-4 according to the invention have rubbery properties similar to those for the control composition C-1, both before curing (rheology properties) and after curing (mechanical properties in extension).

As now regards the endurance (MFTRA fatigue test according to paragraph I-D), it is necessary to distinguish between the properties in the initial state and those after ageing.

In the non-aged (initial state) compositions, it may be noted that the endurance is substantially the same for compositions C-2, C-3 and C-4 according to the invention in comparison to the control composition C-1.

It is therefore important to note that the replacement of part of the (conventional) antioxidant A by the antioxidant B therefore does not have, before ageing of the compositions, any negative effect on the endurance result.

It has however been noted that the use of only antioxidant B, in other words the pure and simple replacement of antioxidant A by antioxidant B under conditions that are otherwise identical—leads to a degraded performance.

On the other hand, unexpectedly, an endurance is observed that is considerably improved (since it is multiplied by three for composition C-2 compared to the control C-1, multiplied by nineteen for composition C-3 compared to the control and by thirteen for composition C-4 compared to C-1) for the compositions according to the invention C-2, C-3 and C-4, an improvement which can only be attributed to the replacement of some of the antioxidant A by the antioxidant B.

Consequently, the plasticizing system of the invention gives the rubber compositions of the invention an overall improved fatigue resistance, with a compromise between resistance in the initial state and after heat ageing which is very markedly improved, in comparison with the compositions of the prior art.

This result allows a person skilled in the art to anticipate a high endurance of the belts and tires according to the invention, in particular with regard to the problem of separation of the ends of the crown plies ("cleavage") described in the introduction to the present application.

TABLE 1

| Composition No. | C-1 | C-2 | C-3 | C-4 |
|---|---|---|---|---|
| NR (1) | 100 | 100 | 100 | 100 |
| Carbon black (2) | 50 | 50 | 50 | 50 |
| Antioxidant (3) | 2.0 | 1 | 0.5 | 1 |
| Antioxidant (4) | — | 1.35 | 2.03 | 1 |
| ZnO (5) | 4 | 4 | 4 | 4 |
| Stearic acid (6) | 2.5 | 2.5 | 2.5 | 2.5 |
| Sulphur | 4 | 4 | 4 | 4 |
| Accelerator (7) | 1 | 1 | 1 | 1 |

(1) Natural rubber;
(2) Carbon black N330 (ASTM grade);
(3) N-1,3-dimethylbutyl-N-phenyl-para-phenylene-diamine (SANTOFLEX 6-PPD from Flexsys);
(4) 4,4',4"-tris(1,3-dimethylbutylamino)tri-phenylamine;
(5) Zinc oxide (industrial grade - Umicore);
(6) Stearin (PRISTERENE 4931 - Uniqema); and
(7) N-dicyclohexyl-2-benzothiazyl sulphenamide (SANTOCURE DCBS from Flexsys).

TABLE 2

| Composition No. | C-1 | C-2 | C-3 | C-4 |
|---|---|---|---|---|
| Properties before curing | | | | |
| $t_i$ (min) | 3.3 | 2.9 | 2.8 | 3.3 |
| $t_{99}$ (min) | 18.1 | 17.9 | 17.9 | 18.2 |
| $t_{99} - t_i$ (min) | 14.8 | 15.0 | 15.1 | 14.9 |
| K (min$^{-1}$) | 0.310 | 0.307 | 0.305 | 0.302 |
| Properties after curing | | | | |
| MA10 (MPa) | 6.84 | 6.85 | 6.98 | 6.95 |
| MA100 (MPa) | 3.9 | 3.8 | 3.8 | 3.8 |
| MA300 (MPa) | 4.5 | 4.4 | 4.3 | 4.5 |
| Tensile strength (MPa) | 26 | 27 | 25 | 26 |
| Elongation at break (%) | 364 | 382 | 363 | 362 |
| Endurance (MFTRA fatigue) | | | | |
| In the initial state (r.u.) | 100 | 102 | 108 | 100 |
| After ageing (r.u.) | 100 | 360 | 1962 | 1300 |

The invention claimed is:

1. A rubber composition based on at least one diene elastomer, a reinforcing filler, a crosslinking system and an antioxidant system, wherein said antioxidant system comprises at least two antioxidants "A" and "B":

A. an N-alkyl-N'-phenyl-para-phenylenediamine corresponding to the formula (I):

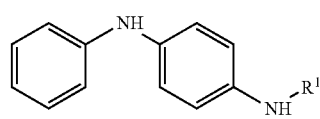

B. a 4,4',4"-tris(1,4-dimethylpentylamino)triphenylamine corresponding to the formula (IV-b):

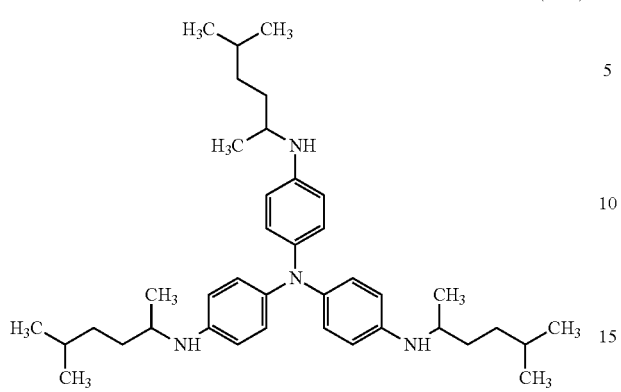

in which formulae, $R^1$ represents a linear or branched alkyl group having from 1 to 12 carbon atoms or a cycloalkyl group having from 5 to 8 carbon atoms, the A/B weight ratio being between 1/10 and 5/1.

2. The composition according to claim 1, wherein antioxidant A is N-isopropyl-N'-phenyl-para-phenylenediamine corresponding to the formula (III-a):

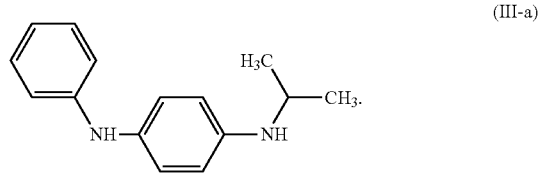

3. The composition according to claim 1, wherein antioxidant A is N-1,3-dimethylbutyl-N'-phenyl-para phenylenediamine corresponding to the formula (III-b):

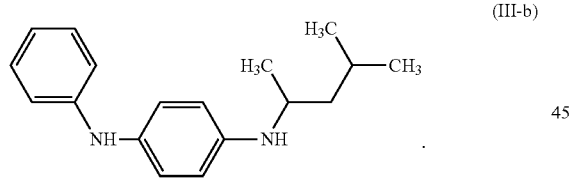

4. The composition according to 1, wherein the content of each antioxidant A and B is between 0.5 and 5 phr, preferably between 0.5 and 3 phr.

5. The composition according to claim 1, wherein the AB weight ratio is between 1/7 and 4/1.

6. The composition according to claim 1, wherein the diene elastomer is chosen from the group formed by polybutadienes, natural rubber, synthetic polyisoprenes, butadiene copolymers, isoprene copolymers and blends of these elastomers.

7. The composition according to claim 6, wherein the diene elastomer is an isoprene elastomer.

8. The composition according to claim 7, wherein the isoprene elastomer is chosen from the group composed of natural rubber, synthetic cis-1,4-polyisoprenes, isoprene copolymers and blends of these elastomers.

9. The composition according to claim 8, wherein the isoprene elastomer is natural rubber.

10. A tire comprising a rubber composition according to claim 1.

11. The tire according to claim 10, said tire being a heavy vehicle tire.

12. The tire according to claim 10, the rubber composition being in the belt of said tire.

13. A process for preparing a rubber composition based on at least one diene elastomer, a reinforcing filler, a crosslinking system and an antioxidant system, said process comprising the steps of:
  a. incorporating into a diene elastomer, in a mixer:
    (i) a reinforcing filler; and
    (ii) an antioxidant system,
    by thermomechanically kneading the entire mixture, in one or more stages, until a maximum temperature between 110° C. and 190° C. is reached;
  b. cooling the entire mixture to a temperature below 100° C.;
  c. then incorporating a crosslinking system; and
  d. kneading the entire mixture up to a maximum temperature below 110° C.,
wherein said antioxidant system comprises at least two antioxidants "A" and "B":
A an N-alkyl-N'-phenyl-para-phenylenediamine corresponding to the formula (I):

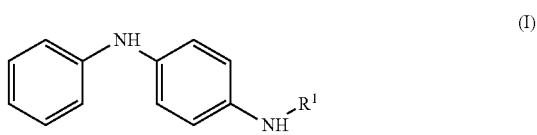

B. a 4,4',4"-tris(1,4-dimethylpentylamino)triphenylamine corresponding to the formula (IV-b):

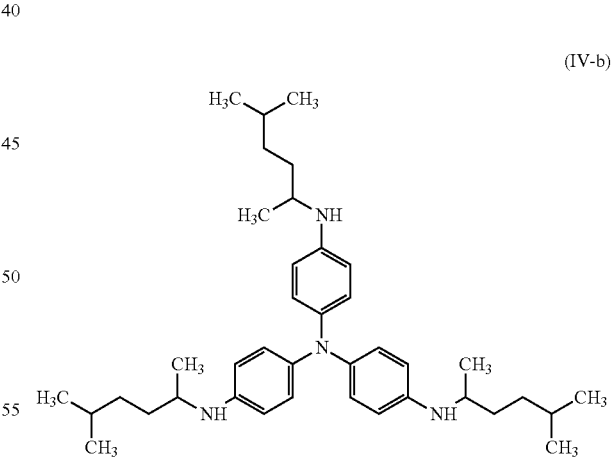

in which formulae, $R^1$ represents a linear or branched alkyl group having from 1 to 12 carbon atoms or a cycloalkyl group having from 5 to 8 carbon atoms, the A/B weight ratio being between 1/10 and 5/1.

* * * * *